K. JASIECKI.
WHEEL.
APPLICATION FILED JAN. 16, 1913.
1,068,590.
Patented July 29, 1913.
2 SHEETS—SHEET 1.
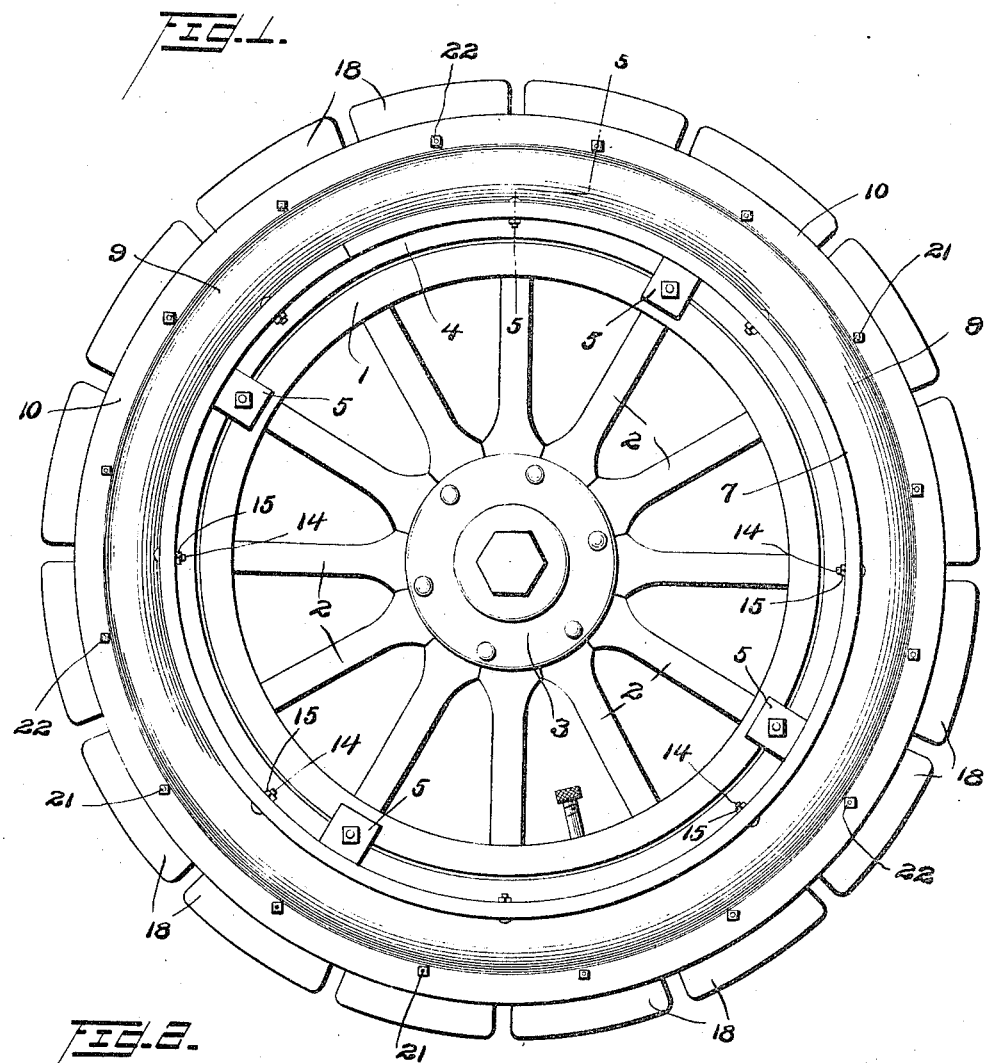
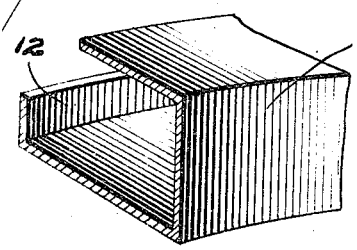
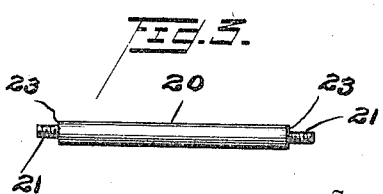
Inventor
Kazimier Jasiecki
Witnesses
By Joshua R. H. Potts
Attorney

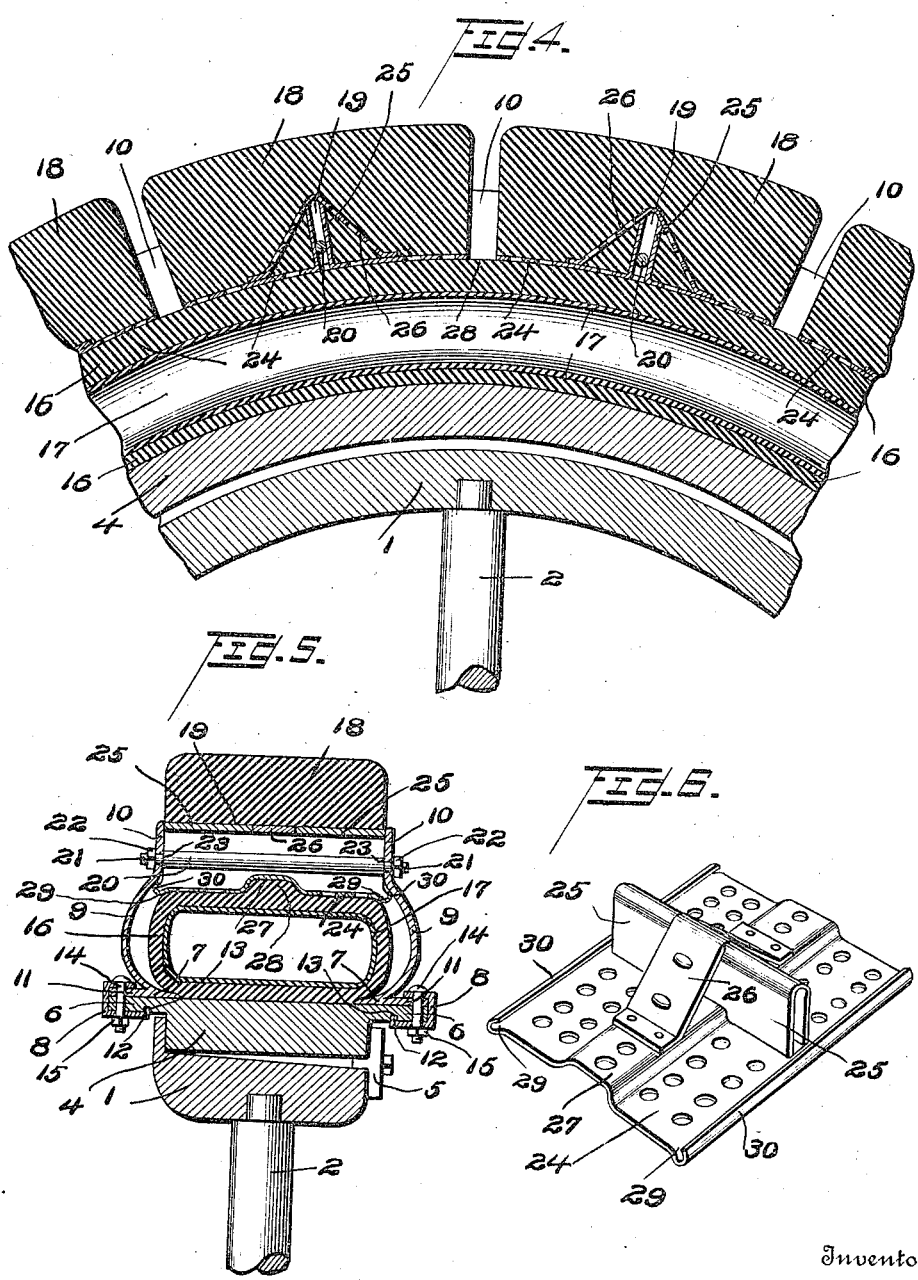

UNITED STATES PATENT OFFICE.

KAZIMIER JASIECKI, OF PHILADELPHIA, PENNSYLVANIA.

WHEEL.

1,068,590.

Specification of Letters Patent.  Patented July 29, 1913.

Application filed January 16, 1913. Serial No. 742,360.

*To all whom it may concern:*

Be it known that I, KAZIMIER JASIECKI, a citizen of the United States, residing at Philadelphia, in the county of Philadelphia and State of Pennsylvania, have invented certain new and useful Improvements in Wheels, of which the following is a specification.

My invention relates to improvements in wheels, and more particularly to an improved construction and arrangement of tire for the wheel, whereby a circular series of radially movable blocks are supported at the periphery of the wheel and are cushioned by a pneumatic tube located inside of the blocks and between parallel plates secured to the rim and felly, whereby the tube is protected against puncture, yet elastically supports the blocks.

A further object is to provide an improved construction of block having a metal reinforcement sustaining the pressure and wear to a large extent, yet allowing the block to be composed in the main of rubber, rubber and canvass, fiber, and any other material suitable for the purpose.

With these and other objects in view, the invention consists in certain novel features of construction and combinations and arrangements of parts as will be more fully hereinafter described and pointed out in the claims.

In the accompanying drawings: Figure 1 is a view in side elevation illustrating my improvements. Fig. 2 is an enlarged fragmentary sectional perspective view illustrating one of the rings designed to hold a side plate on the rim. Fig. 3 is a view in elevation of one of the bolts 20. Fig. 4 is a fragmentary view in longitudinal section illustrating my improved arrangement of parts. Fig. 5 is a view in section on the line 5—5 of Fig. 1, and Fig. 6 is a perspective view of the metal reinforcement for one of the blocks.

1 represents an ordinary wheel felly connected by spokes 2 with the ordinary hub 3, and while my invention is not limited to any particular style of wheel, here shown in connection with the ordinary automobile wheel in general use.

Around the felly 1, a ring 4 is demountably secured by blocks 5 and this ring 4 I shall hereinafter refer to as a "rim" because it constitutes the rim around the felly and supports my improvements as will be now explained. The ring 4, at both side edges, is formed with circular flanges 6, and side plates 7 are secured to these flanges by split rings 8. The side plates 7 are preferably composed of sheet steel or other suitable material bowed outward intermediate their edges as indicated at 9 located parallel to each other at their outer edges as indicated at 10, and having extended bearing surfaces or base portions 11 located against the outer face of rim 4, and confined by the rings 8. These rings 8 are of general channel shape in cross section, except that the inner of their parallel members are longer than the others, and provided with tongues 12 to enter grooves 13 in flanges 6, and are secured against movement by means of bolts 14 which are projected through registering openings in the rings 8, base portions 11 and flanges 6, and secured by nuts 15.

Against the outer face of the rim 4, and between the bowed portions 9 of plate 7, a pneumatic cushioning tube 16 is located. I have illustrated this pneumatic cushioning tube 16 as comprising an outer relatively heavy tube having an inner inflated tube 17, but I, of course, do not limit myself to the inner and outer tube arrangement, but may resort to any form of pneumatic cushioning tube which is adapted for the purpose.

Around the outer edge of the tube 16, a circular series of blocks 18 are located and each block is of general keystone shape, with the adjacent ends of the blocks spaced apart, and all of said blocks provided with radial slots 19 through which bolts 20 project. The bolts 20 have reduced screw-threaded ends 21 which project through openings in plates 7, and are secured by nuts 22. The reduced ends 21 of the bolts provide shoulders 23 against the inner faces of plate 7, so that the nuts 22 cannot bind the plates against the blocks, but insure a uniform spacing of the plates apart to allow a free movement of the blocks in compressing the cushioning tube as will be understood. Each block 18 is composed mainly of rubber, fiber, or any other suitable material or composition which is designed for contact with the ground, and is reinforced by metal plates as indicated in Fig. 6. This metal reinforcement comprises a perforated base plate 24 upon which an inverted U-shaped sheet 25 is secured transversely of plate 24 by a metal strap 26. This metal reinforcement is located in the mold and becomes embedded in the material of the block. The plate 24 constitutes the base of the block; and the metal sheet 25 constitutes a metal wall around the slot 19 to sustain the wear of contact with bolt 20.

It will be noted that the plate 24 is provided centrally with an outwardly bowed portion 27 which fits an annular enlargement 28 on tube 16. It will also be noted that the side edges of plate 24 are bent upwardly and inwardly as indicated at 29 forming metal reinforced tongues 30 at the side edges of the block which extend within the outwardly bowed portions 9 of plates 7, and prevent the blocks from being forced between the parallel portions 10 of said plates. In other words, these tongues 30 limit the outward movement of the blocks and also form rounded enlargements or contact surfaces which, in the event the pneumatic tube collapses, will prevent pinching the tube to cut the same.

In operation, as the wheels move over the ground, the several blocks will press the tube 26 inwardly. If one of the blocks should strike a stone or other obstruction, it will be moved inwardly farther than the others, but this extra movement will be cared for without injury to the tire or the wheel. If one of the blocks becomes broken or worn, it can be readily replaced without the necessity of providing an entirely new tire. Furthermore, it will be noted that the pneumatic cushioning tube is protected from puncture and while it cushions the tire, it is not in direct contact with the ground. Furthermore, it will be noted that the several parts may be readily taken apart, and my improvements lend themselves for use in connection with automobiles and other vehicles employing tires of this general type.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. The combination with a rim, side plates secured to the rim, and a cushioning tube around the rim between the side plates, of a circular series of blocks between the plates and against the tube, each block composed of elastic material and having a metal base plate embedded in the elastic material and an inverted U-shaped sheet on the base plate embedded in the material of the block forming a slot in the block, and bolts projected through the side plates and through said U-shaped sheet, substantially as described.

2. The combination with a rim, side plates secured to the rim, and a cushioning tube around the rim between the side plates, of a circular series of blocks between the plates and against the tube, each block composed of elastic material and having a metal base plate embedded in the elastic material and an inverted U-shaped sheet on the base plate embedded in the material of the block forming a slot in the block, bolts projected through the side plates and through said U-shaped sheet, and straps in all of the blocks secured at their ends to the base plates, and between their ends bearing upon the sheets and embedded in the blocks, substantially as described.

In testimony whereof I have signed my name to this specification in the presence of two subscribing witnesses.

KAZIMIER JASIECKI.

Witnesses:
R. H. KRENKEL,
CHAS. E. POTTS.

---

Copies of this patent may be obtained for five cents each, by addressing the "Commissioner of Patents, Washington, D. C."